Oct. 15, 1968 F. R. GOLDSCHMIED 3,405,724
PURE FLUID CONTROL DEVICE
Filed March 4, 1964 2 Sheets-Sheet 1
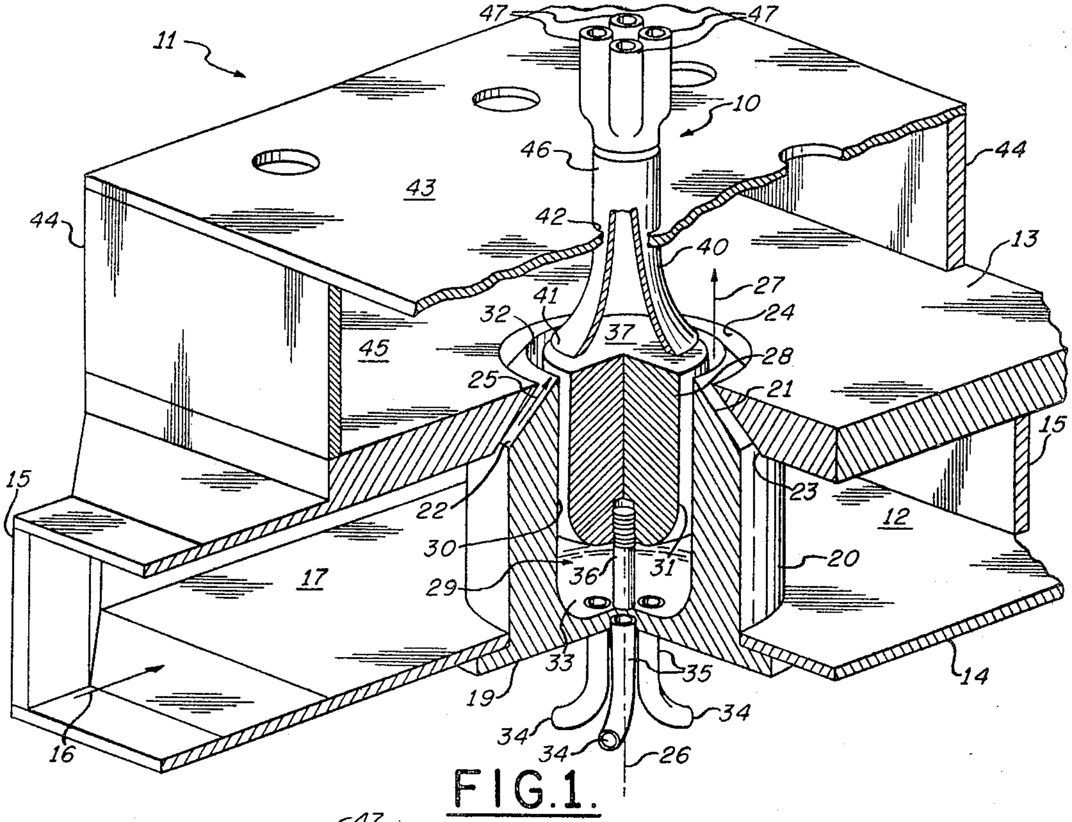
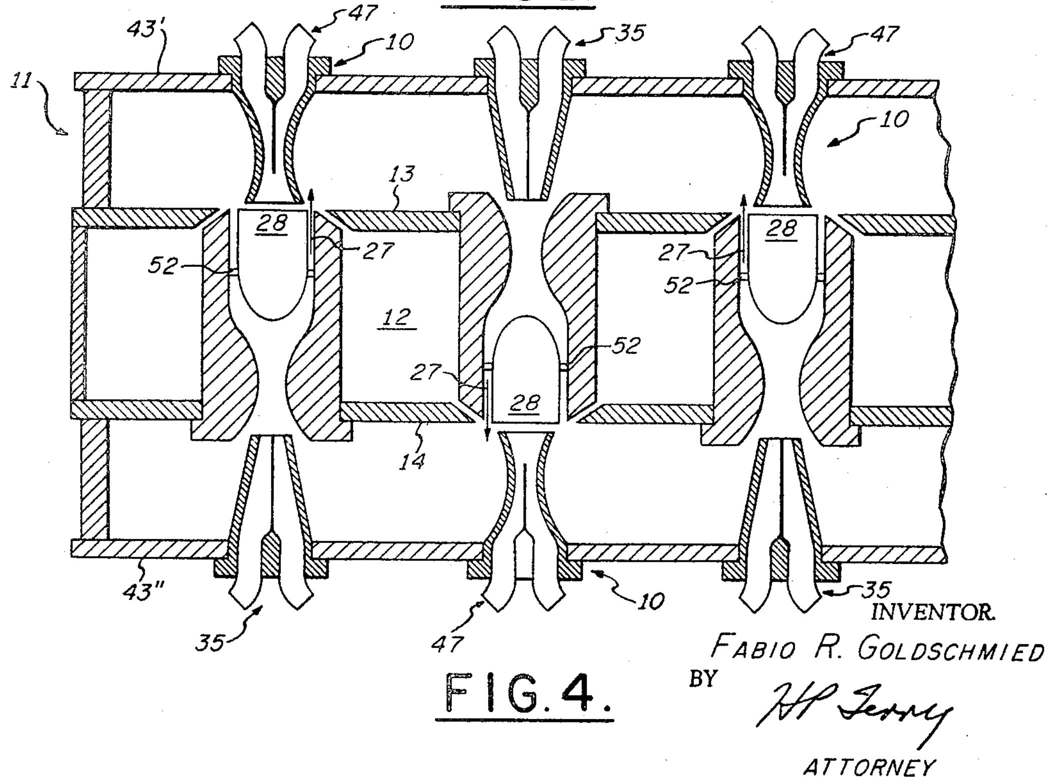
FIG. 4.
INVENTOR
FABIO R. GOLDSCHMIED
BY H P Terry
ATTORNEY INVENTOR.
FABIO R. GOLDSCHMIED
BY
H P Terry
ATTORNEY United States Patent Office 3,405,724
Patented Oct. 15, 1968

3,405,724
PURE FLUID CONTROL DEVICE
Fabio R. Goldschmied, Salt Lake City, Utah, assignor to Sperry Rand Corporation, Great Neck, N.Y., a corporation of Delaware
Filed Mar. 4, 1964, Ser. No. 349,278
3 Claims. (Cl. 137—81.5)

ABSTRACT OF THE DISCLOSURE

An axisymmetrical pure fluid logic device having a power stream tending to converge in a conical pattern with respect to an axis of symmetry and a coaxial control stream for deflecting the power stream with the annular opening which defines the power stream being formed at least partially by a member having a flat surface to which the power stream tends to adhere for focussing the power stream.

The present invention relates to a multi-stable fluid control device which utilizes interacting fluid flows to perform functions which are analogous to some functions now being performed by electronic components. The present invention is particularly applicable for use in pure fluid computer applications.

Electronic components now known for computer applications perform a variety of functions such as switching, detecting, and amplifying a signal. Electronic components of this type are relatively delicate and undesirably sensitive to environmental conditions, temperature, humidity, vibration and radiation as well as others.

Known types of fluid logic devices are primarily of the planar type. They are generally difficult to interconnect due to back pressure problems, they are difficult to fabricate, they do not scale easily, they do not have the desired characteristics of speed and gain, they cannot be theoretically treated by fluid dynamicists readily, they are difficult to instrument.

The present invention provides fluid control devices which because of their axisymmetric arrangement have the following advantages over the above-mentioned prior art devices:

(1) Easy to interconnect without back pressure problems.

(2) Acoustical isolation between stages.

(3) Small interconnection lengths.

(4) Basic array is independent of the interconnection circuitry.

(5) Readily and accurately fabricated by conventional equipment.

(6) The devices will scale properly provided the same flow regime is maintained.

(7) Have desirable speed and gain characteristics.

(8) Can be theoretically treated by fluid dynamicists.

(9) Easy to instrument.

(10) Naturally immune to radiation and can be designed so that temperature-caused expansion or contraction will not affect operation.

(11) Basic packaging can be easily designed to minimize the effect of vibration and shock.

(12) Much less sensitive to contamination than the planar type devices since the axisymmetric devices lack the corners and secondary flow which accumulate dirt and other contaminates.

It is therefore a primary object of the present invention to provide a fluid control device which performs functions which are analogous to those performed by existing electronic or mechanical components.

It is an additional object of the present invention to provide a fluid control device having improved speed and gain characteristics with respect to known fluid control devices.

It is a further object of the present invention to provide a fluid control device whose characteristics can be more accurately controlled than prior fluid control devices.

It is another object of the present invention to provide a fluid control device which is capable of performing fluid logic functions in an improved manner over the known fluid logic devices.

The above objects are achieved by means of an axisymmetric fluid control device comprising a first angularly directed annular jet which is focussed and collected in an output member. A second annular jet is coaxially arranged with respect to the first annular jet for selectively diverting the first jet to prevent the first jet from being collected in the output member. The fluid control device therefore provides an output signal only when the first jet is not deflected by the second jet thus providing a fluid device suitable for many fluid logic computer functions.

These and other objects of the present invention will become apparent by referring to the drawings in which—

FIG. 1 is a perspective view partially in section of a fluid control device constructed in accordance with the present invention;

FIG. 4 is a cross-sectional view of an array showing another embodiment of the fluid control device of the present invention.

Figure 2:
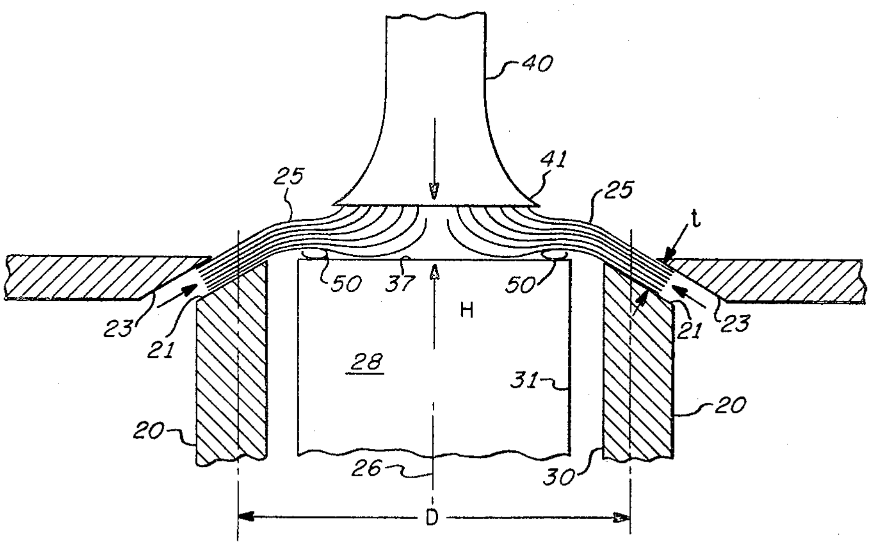
FIG. 2 is a schematic representation showing the relative arrangements of the annular openings and the flow characteristics of the focussed jet.

Referring to FIG. 1, a single fluid control device 10 is shown mounted in a matrix 11 suitable for fluid logic computer applications wherein a plurality of fluid control devices 10 would usually be disposed in close proximity to each other and interconnected to provide various fluid logic computer functions. Only one device 10 is shown for purposes of simplicity. The fluid control device 10 has a power fluid plenum chamber 12 formed by an upper plate 13, a lower plate 14 and exterior walls 15. The power fluid plenum chamber 12 is connected to a constant pressure source of power fluid 16 through a conduit 17 which extends through the exterior wall 15. The fluid control device 10 further includes a hollow cylindrical body element 20 having one extremity in the form of a base 19 which is secured to the lower plate 14 by cementing, welding or other suitable means, not shown, to form an air tight connection. The other extremity of the body element 20 has an upper surface 21 that is bevelled or camfered at, for example, a 60° angle and extends through an opening 22 in the upper plate 13. The lower surface 23 of the upper plate 13 adjacent the upper surface 21 is also bevelled at the same angle as the surface 21 in order that the spaced surfaces 21 and 23 are cooperative to define an annular power fluid orifice or opening 24 from which an annular power fluid jet 25 issues that is inwardly inclined at an angle of approximately 60° with respect to the axis of symmetry 26 of the body element 20.

To form an annular control fluid jet 27 coaxial with and cooperative with the annular power fluid jet 25, a solid cylindrical plug 28 is mounted within the circular cavity 29 of the hollow body element 20 in order that their axes of symmetry 26 are coincident. The diameter of the plug 28 is slightly less than that of the cavity 29 and the interior wall 30 of the body element 20 and the exterior wall 31 of the plug 28 are arranged parallel to each other and to the axis 26 as well as spaced with respect to each other thereby providing an annular control fluid orifice 32 therebetween which defines the upwardly directed annular control fluid jet 27 in a manner to be more fully explained. As viewed in the drawing, the height of the plug 28 is shorter than the height of the cavity 29 in order to provide a small control fluid plenum chamber 33 which communicates with one or more control fluid sources indicated by the reference numeral 34 by means of a corresponding number of control fluid input conduits 35. The control fluid input conduits 35 may be connected, for example, to the output conduits of other fluid control devices. The plug 28 may be secured to the body element 20 by means of a centrally disposed stud 36 which has its lower portion secured to the base 19 and its upper portion threaded to receive the plug 28. The upper portion of the plug 28 has a flat surface 37 which is disposed in substantially the same plane as the upper extremity of the body 20 and the upper surface of the upper plate 13.

Figure 3:
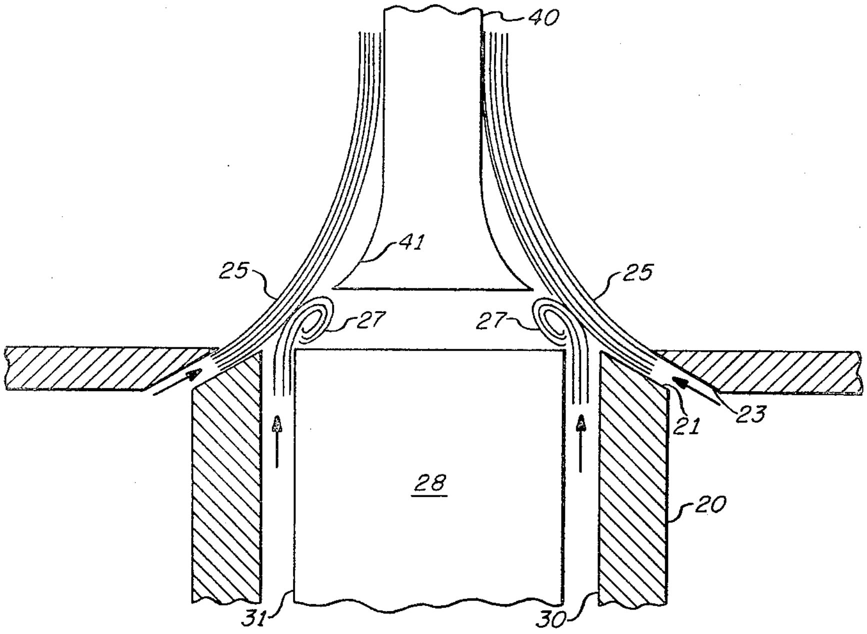
FIG. 3 is a view similar to FIG. 2 showing the first annular jet deflected by a second annular jet.

A hollow flared output tube 40 has its axis of symmetry coincident with the axis 26 and its flared end 41 adjacent the flat surface 37 of the plug 28 and in slightly spaced relation with respect thereto in a manner to be more fully explained with respect to FIGS. 2 and 3. The diameter of the flared end 41 is slightly less than the diameter of the plug 28. The output tube 40 extends through an opening 42 in a support plate 43 which supports the output tube 40. The support plate 43, the upper surface of the upper plate 13, and the exterior walls 44 define an exhaust plenum chamber 45 which may be connected back to the inlet of the source 16 by means not shown. The extremity 46 of the output tube 40 which extends through the support plate 43 may be connected to a plurality of output conduits 47 which in turn may be connected to input conduits 35 of other control devices 10 to perform desired fluid logic computations.

The operation of the present invention will be described by referring to FIGS. 1, 2, and 3. The power fluid under constant pressure in the plenum chamber 12 flows continuously through the angled annular power fluid orifice 24 defined by the surfaces 21 and 23 to provide the angled annular power fluid jet 25 which is inwardly directed at an angle of 60° towards the axis of symmetry 26. The power jet 25 flows inwardly over the flat portion 37 of the plug 28 and is captured by the output tube 40 to flow through the output signal conduits 47 for providing a fluid output signal therefrom. The above description refers to the operation of the fluid control device 10 in the absence of control fluid flow through any of the control fluid input conduits 35.

In the presence of control fluid flowing through any one of the input conduits 35, a control jet 27 is formed which issues from the annular control fluid orifice 32 to provide an annular upwardly directed control fluid jet 27 flowing parallel to the axis of symmetry 26 as viewed in FIG. 1. The upwardly flowing control fluid jet 33 deflects the inwardly flowing power fluid jet 25 resulting in negligible output flow through the output tube 40.

Referring now to FIG. 2 for a more sophisticated explanation, it may be said that in the absence of control fluid flow, the inwardly directed annular power fluid jet 25 has a focussed jet pattern which falls in the category of the Coanda effect because the power jet 25 is sharply deflected toward the flat surface 37 producing very high suction at the inner edge 50 of the power jet 25. This may be accomplished, for example, by inwardly inclining the power jet 25 at a suitable angle, for example 60°, with respect to the axis of symmetry 26 and by arranging the aspect ratio to be larger than 250 where the aspect ratio is defined as $\pi D/t$ where D is the diameter of the annulus of the power jet 25 and $t$ is the thickness of the power jet 25 as shown in FIG. 2. The focussed jet flow of the power jet 25 is efficiently recovered by the coaxially disposed round output tube 40 having a properly flared inlet 41 design.

To provide a fluid logic NOR element, as shown in FIG. 3, the aerodynamic effect discussed above can be controlled by using an upwardly directed annular control fluid jet 27 coaxially arranged with respect to the power jet 25 to change the entrainment pattern of the focussed jet 25 by introducing the control jet 27 near the point 50 of low pressure attachment of the power jet 25 to the plate 37. The control jet 27 then provides the dual function of disrupting the suction effect at the point 50 and deflecting the power jet 25 by momentum interchange, thus causing the power jet 25 to quickly deflect into the unfocussed flow regime as shown in FIG. 3. The power jet 25 and the control jet 27 thereby exhaust into the exhaust plenum chamber 45 and provide no output signal through the output tube 40.

Utilizing this principal, it has been found that extremely small flows from the control jet 27 may switch relatively large power jets 25 because the suction volume is quite small and the suction effect is quite high. This results in appreciably higher gain or amplification than can be achieved with prior art fluid logic devices.

Further, prior art fluid logic devices suffer from acoustical and back pressure effects which are eliminated in the present invention by spacing the output tube 40 with respect to the openings from which the jets 25 and 27 issue.

As shown in FIG. 2, the spacing H between the flat surface 37 of the plug 28 and the output tube 40 can vary between $D/4$ and $D/10$. The values of D, $t$ and H employed in a successfully operating device are:

$D$=approximately 1.0 inch
$t$=approximately 10 mils
$H$=approximately 0.2 inch

An alternative embodiment of the present invention is shown in FIG. 4 in which a matrix 11 of numerous fluid control devices 10 of the focussed jet variety is shown. Here the plenum chamber 12 is shown in an extended form as defined by plates 13 and 14. The plates 13 and 14 are arranged in such a manner that the body elements 20 of the fluid devices 10 are alternately supported such that the control flow of the jets 27 is generally opposite in direction with respect to its adjacent device 10. The plates 43' and 43'' are arranged to position and support the respective input conduits 35 and output conduits 47. In this embodiment, the plug 28 is secured to the body element 20 by means of horizontal pins 52 which are arranged so that they do not interfere with the control jet 27.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An axisymmetrical fluid control device comprising, a power stream source, a first annular opening connected to said power stream source for providing a continuous annual fluid power stream disposed to converge in a conical pattern with respect to the axis of symmetry of said first opening, a control stream source, a second annual opening connected to said control stream source for selectively providing an annular fluid control stream parallel to said axis of symmetry for deflecting said power stream, said second annular opening being coaxially arranged with respect to said axis of symmetry within said first annular opening, said second annular opening being formed at least partially by a member having a flat surface to which said annular power stream tends to adhere for at least a portion thereof for focussing said annular power stream with respect to said axis of symmetry in the absence of said annular control stream, and an output conduit coaxially arranged with respect to said axis of symmetry and in spaced proximate relationship to said flat surface and cooperative with said power stream for providing an output signal in the absence of said control stream.

2. In a fluid control device of the character recited in claim 1 in which the aspect ratio is greater than 250 where the aspect ratio is defined as $\pi D/t$ where D is the diameter of the annulus of said power stream and $t$ is the thickness of said power stream.

3. In a fluid control device of the character recited in claim 1 in which the spacing between said flat surface and said output conduit is between $D/4$ and $D/10$ where D is the diameter of the annulus of said power stream.

References Cited

UNITED STATES PATENTS

| | | | |
|---|---|---|---|
| 2,692,800 | 10/1954 | Nichols et al. | 137—81.5 |
| 3,039,490 | 6/1962 | Carlson | 137—81.5 |
| 3,155,825 | 11/1964 | Boothe | 137—81.5 |

FOREIGN PATENTS

| | | |
|---|---|---|
| 562,573 | 5/1957 | Italy |

OTHER REFERENCES

IBM Technical Disclosure Bulletin, vol. 6, No. 5, October 1963.

M. CARY NELSON, *Primary Examiner.*

W. R. CLINE, *Assistant Examiner.*